S. P. COTA.
AIR BRAKE SYSTEM SIGNALING APPARATUS.
APPLICATION FILED MAY 1, 1909.
952,070.
Patented Mar. 15, 1910.
2 SHEETS—SHEET 1.
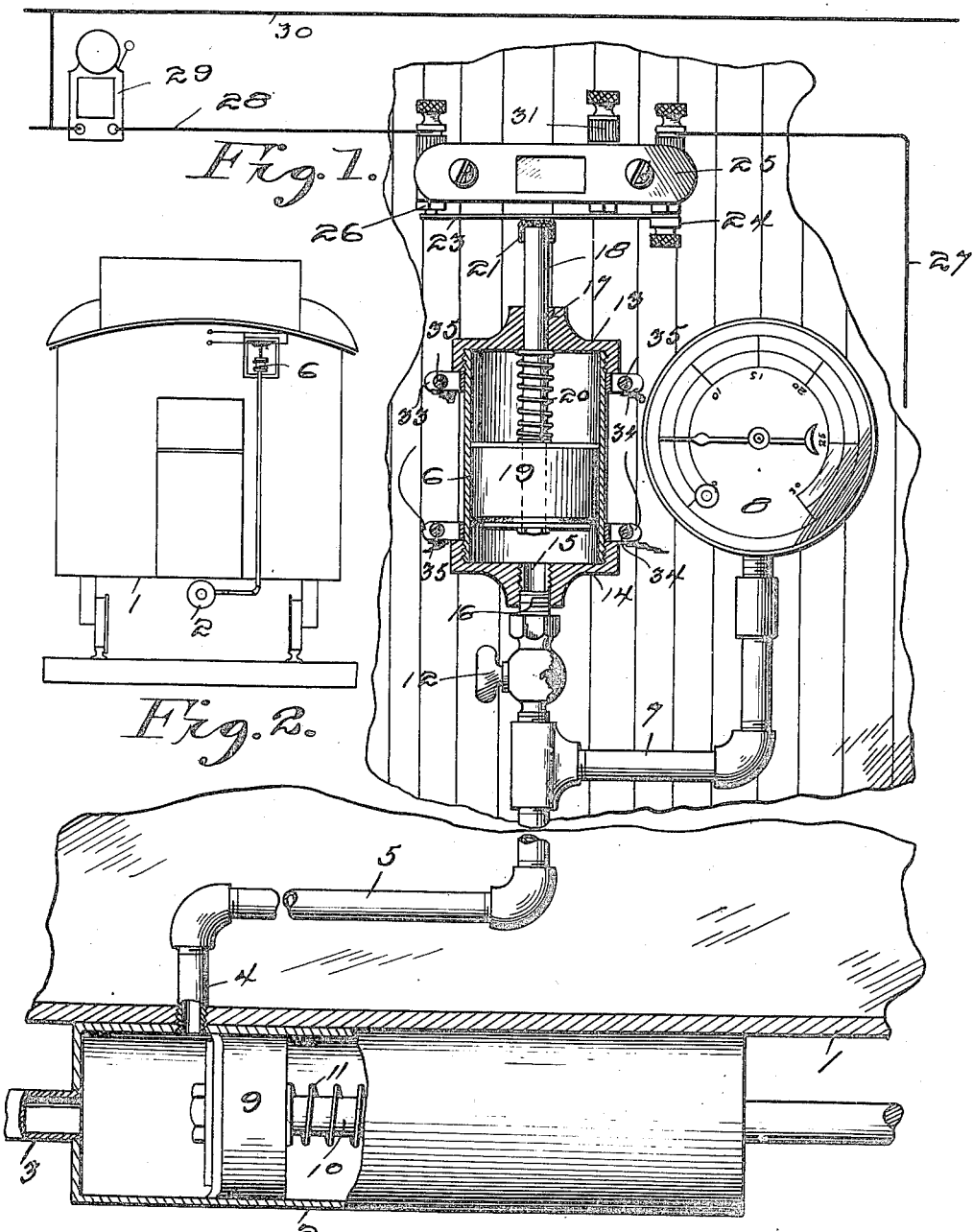
Witnesses
Inventor
Simon P. Cota S. P. COTA.
AIR BRAKE SYSTEM SIGNALING APPARATUS.
APPLICATION FILED MAY 1, 1909.
952,070.
Patented Mar. 15, 1910.
2 SHEETS—SHEET 2.
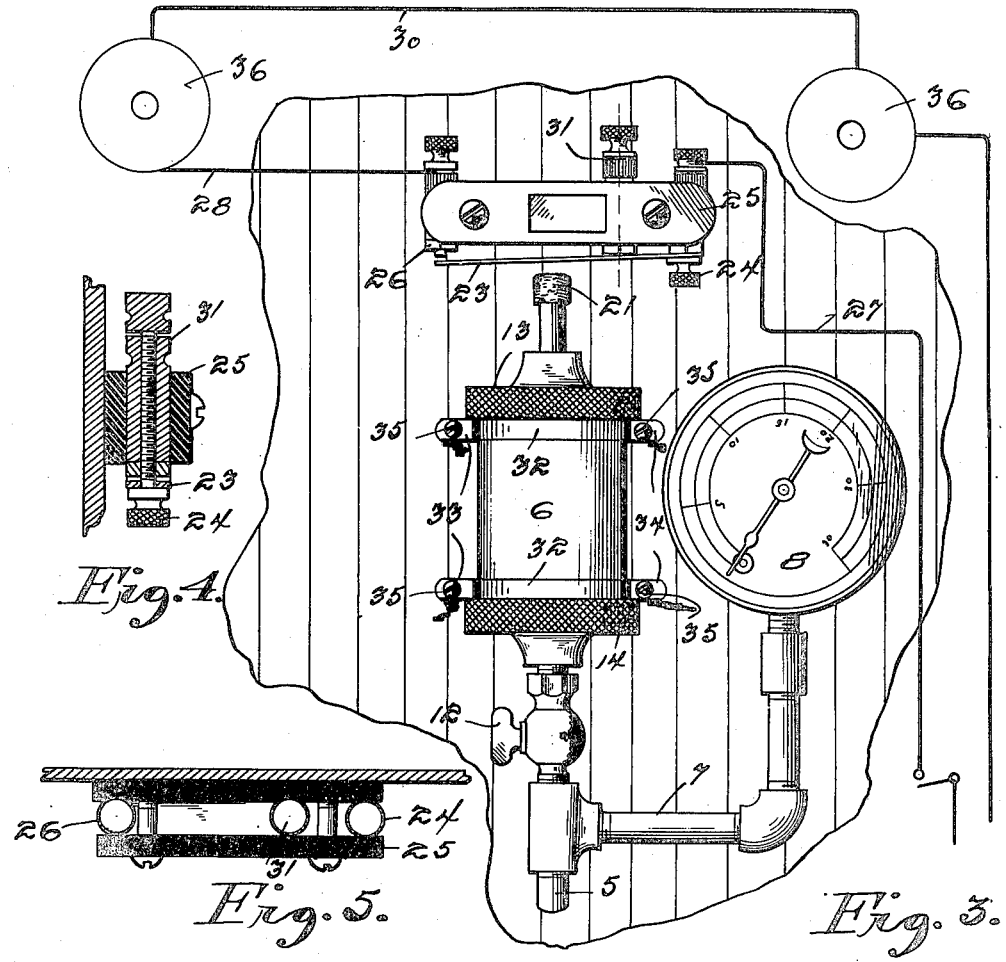
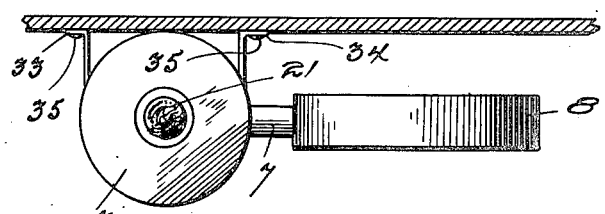
Witnesses
Inventor
Simon P. Cota.
Attorney.

UNITED STATES PATENT OFFICE.

SIMON P. COTA, OF DICKINSON, NORTH DAKOTA.

AIR-BRAKE-SYSTEM SIGNALING APPARATUS.

952,070.   Specification of Letters Patent.   Patented Mar. 15, 1910.

Application filed May 1, 1909.   Serial No. 493,391.

*To all whom it may concern:*

Be it known that I, SIMON P. COTA, a citizen of the United States, residing at Dickinson, in the county of Stark and State of North Dakota, have invented certain new and useful Improvements in Air-Brake-System Signaling Apparatus, of which the following is a specification, reference being had therein to the accompanying drawing.

This invention relates to a signaling apparatus for indicating the condition of the air pressure in any one of the brake cylinders of an air brake system, and the principal object of the same is to provide an apparatus by means of which it will be automatically indicated by means of signals actuated by the air entering said cylinder whether the air brakes are acting properly or not, and thereby automatically notifying the train crew as to the condition of the air brakes so that they may immediately give attention to the same, should it develop by the operation of said signals that leakage or other causes had taken place whereby the brakes were not acting properly.

In carrying out the general object of the invention stated above, it will, of course, be readily understood that the essential features thereof are susceptible of changes in details and structural arrangements, but one preferred and practical embodiment thereof is shown in the accompanying drawings, wherein—

Figure 1 is a diagrammatic view of the invention, parts thereof being shown in section. Fig. 2 is an end view of a car showing the invention applied thereto. Fig. 3 is a detailed diagrammatic view of the signal operating mechanism, showing two visual signals in circuit therewith. Fig. 4 is a vertical sectional view of a contact block used in connection with the invention. Fig. 5 is a horizontal sectional view of the same. Fig. 6 is a plan view of the signal operating cylinder and pressure gage.

Referring to said drawings by numerals, 1 designates the flooring of a car from which the usual air brake cylinder 2 is suspended from the underside thereof, said cylinder having an inlet pipe 3 at one end and being provided with a lateral pipe connection 4 which is located at a point on the cylinder 2 adjacent to its end with which the pipe 3 connects, said point being generally known as the leakage groove on the air brake cylinder, and extends through the floor or platform of the car and connects with a service pipe 5, which may be composed of a plurality of angular sections and connecting elbows to provide for the various portions of the car through which it passes, said pipe terminating at its outer end in a cylinder 6, and also having an intermediate branch connection 7 with a pressure gage 8.

The cylinder 2 has a piston 9 therein, the stem or rod 10 of which has a spiral spring 11 coiled thereon and interposed between the piston 9 and the rear end of said cylinder and which is constantly exerting a pressure to force said piston in a direction to seal the inlet pipe 3. The incoming air will, of course, force said piston in the opposite direction until it has uncovered the entrance to pipe 4, whereupon air will enter the same and pass through service pipe 5 to operate the pressure gage 8 and simultaneously enter the cylinder 6.

As has been stated before, the cylinder 6 is a part of the mechanism for operating an audible signal so that the attention of the train crew may be called to the gage 8 which serves as a visual signal, and as such is of special value as a night signal. For daylight use the gage in itself would ordinarily be sufficient as it is supported by the branch pipe in a conspicuous position. And to provide for using the gage independently, the service pipe 5 may be provided with a plug valve 12 above the branch pipe 7 so as to cut off communication with said cylinder 6.

The cylinder 6 has detachable end caps 13 and 14 which are centrally thickened, the lower one having a threaded opening 15 formed through it for a nipple 16 which forms the communication between the cylinder and the service pipe 5. The upper cap is provided with a guiding opening 17 for a piston stem or rod 18, the piston 19 of which has an air tight fit within the cylinder 6 and between which and the upper cap 13 a spiral spring 20 is coiled about said stem and exerts a pressure tending to force said piston to a position where it will seal the opening 15. The stem 18 projects beyond the upper cap 13 of the cylinder and has an insulated covering or cap 21 at its projected end adapted to contact with a spring contact 23 carried by a binding post 24 held between two insulating blocks 25, having a screw or bolt connection with the car. The binding post 24 is located at one end of said insulated blocks 25 and supports the spring contact at one end only, so that when the insulated end of the piston rod 18 contacts with said contact, the free end thereof will be brought into contact with a binding post 26 at the other end of said blocks 25, and complete a circuit through feed wire 27, post 24, and spring contact 23, post 26, wire 28, bell or other signal 29, and wire 30. A tension bolt 31 is also supported between the blocks 25 to regulate the tension of the contact.

The cylinder 6 is held in a vertical position on the side of a car by means of the upper and lower bands 32 which embrace the same and have their ends 33—34 outturned and held in rigid but detachable engagement with the car by means of the screws 35 or equivalent fasteners.

It will be seen from the foregoing that when the pressure of the air entering the cylinder 2 is sufficient to overcome the resistance of the spring pressed piston, the latter will be forced back so as to permit the air to enter the service pipe 5 and operate the pressure gage and the piston within the cylinder 6, the latter piston being caused to complete the circuit to the signal and sound the same and thereby call the train crew.

In Fig. 3 of the accompanying drawings two signals have been shown which are operated by the cylinder 6; said signals may be in the form of lamps or other night signals 36 which project from the sides of the cars so as to be readily visible from the cab of the locomotive. These signals operate, of course, in conjunction with the bell signal 29 heretofore described, although the said bell signal is designed and particularly adapted for use as a day signal as will be obvious.

The invention is of special utility in locating what is known as "dynamiting" brakes, in which the brakes of one car may be forcibly set in such manner as to cause the wheels to slide with the resultant danger of the couplers being pulled out. This dynamiting action of the brakes usually results from a defective triple valve, whereby the pressure fails to act on the first application, but on the second application, the force of the pressure is multiplied, thereby setting the brakes with from two to four times the force intended or necessary. It will be seen, that the present invention indicates audibly on each car the fact that the brakes have been properly applied the force of which may be readily ascertained by the crew, and in the night, the engineer by looking back may readily ascertain if all the signals are being displayed so that he may be informed as to the condition of his train, and if a "dynamiter" is among them, the same may be quickly cut-out.

By means of this invention, the signal apparatus will act whether the air in an air brake system is working properly or improperly. If the air is working properly, the signal apparatus will act only when the engineer of a train reduces the train line pressure which causes the brakes to set, and thereupon the signals will be displayed. When the engineer recharges the train line which releases the brakes, then the signals are closed; or, if from any cause, there should be enough air escaping from any defect in the air brake system to set the brakes, the signal apparatus will act just the same as if the engineer had reduced the air pressure. Such would be the case should the train break apart, or an air hose pipe burst. In this way timely notice is given to an engineer and to a train crew of any irregularity, or accident in the air brake system, so as to attend to the same and prevent accidents.

When it is desired to make a stop or to test the brake, the engineer by the use of what is called the engineer air brake valve makes a reduction of the air pressure from the train line pipe. When this is done, the triple valve drops down far enough to let the air stored in the auxiliary reservoir of the air brake system to flow back through a port in the triple valve cylinder and into the brake cylinder. When the air enters the brake cylinder, it forces the piston head 9 forward and the piston rod 10 being connected up with levers and rods connected to the brakes sets the same. Now to release the brakes, the engineer places the valve in full feed position and recharges the train line pipe and the auxiliary reservoir, and then the brakes are released again.

By reason of the apparatus shown and described in Fig. 1 and connected as shown at the point adjacent to the inlet air end of the brake cylinder, when the piston head 9 is forced ahead of the opening with which the pipe 5 is connected, then the air passes into the air pipe 5 leading from the air brake cylinder to the air pressure cylinder 6, which forces the piston 19 upward, thereby closing the electric circuit which causes an alarm to be sounded and night visual signals to be displayed, and the indicator on the air gage is shown to be operated at the same time. When the engineer releases the brakes, the piston head 9 of the brake cylinder returns to its normal position by means of the spiral spring 11 and the air escapes from the pressure cylinder 6 through the brake cylinder and the indicator on the air gage drops back to its normal position, and the lights or visual signals go out since the electric current is broken. When this is done, the engineer and train crew know that the brakes are in good working condition. By means of the cut-out valve 12, the gage may only be used during the day time if desired; or, it may be so arranged that the gage and the bell or other audible signal may be used in the day time with the night signals cut off from the electric circuit.

What I claim as my invention is:—

1. In an apparatus of the character described, the combination with an air brake cylinder, of a reacting air pressure cylinder having a piston and a piston rod forming a circuit breaker, an electric circuit including an audible signal, a make-and-break contact device operated by said circuit breaker, and an air pipe connecting said pressure cylinder with the air brake cylinder at a point adjacent to the inlet air pipe of the air brake cylinder.

2. In an apparatus of the character described, an air brake cylinder, a reacting air pressure cylinder having a piston and a piston rod forming a circuit breaker, an electric circuit, an audible signal in said circuit, a make-and-break contact device adapted to be operated upon by said circuit breaker, an air pipe connecting said pressure cylinder with the air brake cylinder at a point adjacent to the inlet air pipe of the air brake cylinder, and a pressure gage connected by an air pipe with said first-mentioned air pipe.

3. In an apparatus of the character described, an air brake cylinder, a reacting air pressure cylinder having a piston and piston rod forming a circuit breaker, an air pipe connecting said air pressure cylinder with the air brake cylinder at a point adjacent to the inlet air pipe of the air brake cylinder, an electric circuit, signals in said circuit, and a make and break contact device in said circuit adapted to be operated upon by said circuit breaker.

4. In an apparatus of the character described, an air brake cylinder in combination with a reacting air pressure cylinder having a piston and piston rod forming a circuit breaker, an electric circuit having a make-and-break contact device adapted to be operated upon by said circuit breaker, an audible signal in said electric circuit, an air pipe connecting said air pressure cylinder with said air brake cylinder at a point adjacent to the inlet air pipe of the air brake cylinder and having a cut out valve, a branch pipe extending from said air pipe between the cut out valve and the air brake cylinder, and a pressure gage connected with said branch pipe.

In testimony whereof I hereunto affix my signature in presence of two witnesses.

SIMON P. COTA.

Witnesses:
A. H. ARNETT,
JAMES SOULES.